United States Patent
Rydnell et al.

(10) Patent No.: US 9,320,051 B2
(45) Date of Patent: *Apr. 19, 2016

(54) EVOLVED ALLOCATION RETENTION POLICY SOLUTION

(71) Applicant: Telefonaktiebolaget L M Ericsson (publ), Stockholm (SE)

(72) Inventors: Gunnar Rydnell, Vastra Frolunda (SE); Dirk Kopplin, Ytterby (SE); Lasse Olsson, Stenungsund (SE); Yong Yang, Molndal (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/565,641

(22) Filed: Dec. 10, 2014

(65) Prior Publication Data
US 2015/0092727 A1    Apr. 2, 2015

Related U.S. Application Data

(63) Continuation of application No. 13/496,977, filed as application No. PCT/EP2010/053469 on Mar. 17, 2010, now Pat. No. 8,964,668.

(60) Provisional application No. 61/245,781, filed on Sep. 25, 2009.

(51) Int. Cl.
*H04W 72/10* (2009.01)
*H04W 76/02* (2009.01)
(Continued)

(52) U.S. Cl.
CPC ............. *H04W 72/10* (2013.01); *H04W 8/04* (2013.01); *H04W 8/20* (2013.01); *H04W 60/00* (2013.01); *H04W 72/0406* (2013.01); *H04W 76/022* (2013.01); *H04W 8/18* (2013.01)

(58) Field of Classification Search
CPC ....... H04W 76/022; H04W 8/04; H04W 8/20; H04W 60/00; H04W 72/0406; H04W 72/10; H04W 8/18
See application file for complete search history.

(56) References Cited

U.S. PATENT DOCUMENTS

| | | |
|---|---|---|
| 2005/0135389 A1 | 6/2005 | Hurtta .......................... 370/401 |
| 2006/0135172 A1* | 6/2006 | Dronne et al. ............. 455/452.2 |

(Continued)

FOREIGN PATENT DOCUMENTS

| | | |
|---|---|---|
| WO | 2005029787 A1 | 3/2005 |
| WO | 2007112784 A1 | 10/2007 |

(Continued)

OTHER PUBLICATIONS

"Digital cellular telecommunications system (Phase2+); Universal Mobile Telecommunications System (UMTS), LTE; Quality of Service (QoS) concept and architecture (3GPP YS23.107 Version 8.0.0 Release 8)", ETSI TS 123 107 V8.0.0, Jan. 1, 2009, 42 pages, XP014042997.

(Continued)

*Primary Examiner* — Brian D Nguyen
(74) *Attorney, Agent, or Firm* — Rothwell, Figg, Ernst & Manbeck, P.C.

(57) ABSTRACT

The present invention relates to a solution for handling an evolved allocation and retention priority in a telecommunications network. The solution is based on obtaining an evolved ARP, obtaining an authorized ARP based on the evolved ARP, and transmitting this authorized ARP to nodes in the network. Furthermore, the authorized ARP may be included in information elements involved in mobility procedure messages.

20 Claims, 4 Drawing Sheets

(51) Int. Cl.
*H04W 8/04* (2009.01)
*H04W 8/20* (2009.01)
*H04W 60/00* (2009.01)
*H04W 72/04* (2009.01)
*H04W 8/18* (2009.01)

(56) References Cited

U.S. PATENT DOCUMENTS

| | | | |
|---|---|---|---|
| 2007/0030830 A1 | 2/2007 | Sagne et al. | 370/336 |
| 2008/0031273 A1 | 2/2008 | Wang | 370/444 |
| 2008/0123660 A1* | 5/2008 | Sammour et al. | 370/395.21 |
| 2008/0186862 A1* | 8/2008 | Corbett et al. | 370/237 |
| 2008/0279139 A1* | 11/2008 | Beziot et al. | 370/329 |
| 2009/0113487 A1 | 4/2009 | Nanjunda Swamy | 725/62 |
| 2009/0238207 A1* | 9/2009 | Zhao et al. | 370/468 |
| 2009/0245202 A1 | 10/2009 | Gras et al. | 370/331 |
| 2009/0253435 A1 | 10/2009 | Olofsson et al. | 455/450 |
| 2009/0310613 A1 | 12/2009 | Wang et al. | 370/400 |
| 2009/0316656 A1* | 12/2009 | Zhao et al. | 370/331 |
| 2010/0046369 A1* | 2/2010 | Zhao et al. | 370/232 |
| 2014/0064074 A1 | 3/2014 | Huang et al. | 370/230 |

FOREIGN PATENT DOCUMENTS

| | | | | |
|---|---|---|---|---|
| WO | WO 2007112784 A1 | 10/2007 | | H04L 12/56 |
| WO | 2008017708 A1 | 2/2008 | | |

OTHER PUBLICATIONS

"LTE; General Packet Radio Service (GPRS) Enhancements for Evolved Universal Terrestrial Radio Access Network (E-UTRAN) access (3GPP TS 23.401 version 8.6.0 Release 8)", ETSI TS 123 401, V8.6.0, Jun. 1, 2009, 230 pages, XP014044536.
Ericsson, "Evolved ARP", 3GPP TSG CT4, Meeting #46, C4-092904, Oct. 12-16, 2009, 5 pages, XP050386566.
Ericsson, "Evolved ARP", 3GPP TSG CT4, Meeting #47, C4-093588, Nov. 9-13, 2009, 6 pages, XP050386565.
Ericsson, "Evolved ARP", 3GPP TSG CT4, Meeting #47, C4-094225, Nov. 9-13, 2009, 26 pages.
Ericsson, "Enhanced ARP", 3GPP TSG-SA WG2, Meeting #76, S2-096920, Nov. 16-20, 2009, 88 pages, XP050397804.
Ericsson, "Enhanced ARP", 3GPP TSG-SA WG2, Meeting #76, S2-097542, Nov. 16-20, 2009, 80 pages.
English Translation of Chinese Office Action for CN appln. No. 201080043802.0, issued Apr. 2, 2014, 17 pages.
"LTE; General Packet Radio Service (GPRS) Enhancements for Evolved Universal Terrestrial Radio Access Network 2 (E-UTRAN) access (3GPP TS 23.401 version 8.6.0 Release 8)", ETSI TS 123401, V8.6.0, Jun. 1, 2009, 230 pages, D XP014044536.
English language translation of Office Action issued in corresponding Chinese Application No. 201080043802.0 on Nov. 3, 2014, 22 pages.

* cited by examiner

EVOLVED ALLOCATION RETENTION POLICY SOLUTION

CROSS REFERENCE TO RELATED APPLICATIONS

This application is a continuation of application Ser. No. 13/496,977 now U.S. Pat. No. 8,964,668, which has a filing date of Mar. 17, 2010 and which is a 35 U.S.C. §371 National Phase Entry Application from PCT/EP2010/053469, filed Mar. 17, 2010, designating the United States and claiming priority to U.S. provisional application 61/245,781, filed Sep. 25, 2009. Each of the above identified applications and publications are incorporated by reference herein in their entirety.

TECHNICAL FIELD

The present invention relates to a solution for handling an evolved allocation and retention priority in a telecommunications network.

BACKGROUND

Allocation and retention priority was introduced into 2G/3G packet network according to TS 3GPP 23.107. It is used to specify the relative importance compared to other UMTS bearers for allocation and retention of the UMTS bearer. Priority is used for differentiating between bearers when performing allocation and retention of a bearer. In situations where resources are scarce, the relevant network elements can use the Allocation/retention Priority to prioritize bearers with a high Allocation/retention Priority over bearers with a low Allocation/Retention Priority when performing admission control.

The Allocation/Retention Priority attribute is a subscription attribute which is not negotiated from the mobile terminal, but the value might be changed either by the SGSN or the GGSN network element.

By introducing new services into packet domain such as multiple priority service, the Allocation and Retention Priority is evolved.

The evolved ARP comprises information about the priority level (scalar), the pre-emption capability (flag), and the pre-emption vulnerability (flag). The priority level defines the relative importance of a resource request. This allows deciding whether a bearer establishment or modification request may be accepted or needs to be rejected in case of resource limitations (typically used for admission control of GBR traffic). It may also be used to decide which existing bearers to pre-empt during resource limitations.

The range of the ARP priority levels is 1 to 15 with 1 as the highest level of priority. The pre-emption capability information defines whether a service data flow may get resources that were already assigned to another service data flow with a lower priority level. The pre-emption vulnerability information defines whether service data may lose the resources assigned to it in order to admit a service data flow with higher priority level. The pre-emption capability and the pre-emption vulnerability may be either set to "yes" or "no".

For example, video telephony is one use case where it may be beneficial to use EPS bearers with different ARP values for the same UE. IN this use case an operator could map voice to one bearer with a higher ARP and video to another bearer with a lower ARP. In a congestion situation (e.g. at call edge) the eNB may then drop the "video bearer" without affecting the "voice bearer". This would improve service continuity.

In the current packet core network, according to 3GPP 23.107 (table 4): value ranges for UMTS bearer service attributes, (ARP) Allocation/retention Priority is defined as a scalar with a range 1-3 which has been implemented at the Gr interface and Gn/Gp interface.

How to introduce the Evolved ARP and at the same time to avoid the backwards compatibility issues becomes a problem.

PDG-GW supporting E-UTRAN access with MME/S4-SGSN need to communicate with legacy SGSN via Gn/Gp interface to allow UE handover from 2G/2G to E-UTRAN access, and vice versa.

The legacy SGSN, GGSN, and HLR need a solution to seamlessly migrate to the Evolved ARP concept to allow introducing the services which evolved ARP is required. Again, PDN-GW and MME need a solution to communicate with legacy SGSN when come to ARP handling.

SUMMARY

The present invention related to a solution introducing optional Information Elements (IE) to carry Evolved ARP separately from the legacy ARP. New optional IEs are needed for both Gr interface and Gn/Gp interface.

Furthermore, SGSN, and GGSN/PDN-GW are able to map between legacy ARP and Evolved ARP.

The present is realized in a number of aspects in which a first is a method in an infrastructure node. The method is used for handling allocation and retention priority in a telecommunications network. The method comprises steps of obtaining a trigger event for changing status of a user equipment (UE) wirelessly attachable to the telecommunications network, receiving from a subscriber registration node information of subscribed allocation and retention priority (ARP) for the UE, the ARP information comprising a combination of legacy ARP and evolved ARP, including the legacy and evolved ARP information in a control message transmitted to a gateway node, obtaining from the gateway node information about an authorized ARP, and transmitting the authorized ARP information to a radio network connecting the UE without further validation against subscribed ARP from the subscriber registration node.

The authorized ARP information may be transmitted in both an Evolved ARP information element and a Quality of Service Profile information element.

The trigger event may be at least one of an activation of primary PDP context, an inter SGSN mobility procedure, such as a radio access technology change, i.e. IRAT, an inter SGSN Routing Area Update, and a Packet Switched, i.e. PS, handover.

The infrastructure node may be one of SGSN or MME and the subscriber registration node may be one of HLR or HSS.

The subscribed ARP information may be received in a map insert subscriber data procedure via a Gr interface between the subscriber registration node and a serving node.

The method may be arranged so as to if the infrastructure node only receives legacy ARP from the subscriber registration node, further comprise a step of mapping the legacy ARP to evolved ARP before transmitting to the gateway node. The gateway node may be one of a PDN-GW with a Gn or Gp interface towards a SGSN or a GGSN without an EPC interface.

Another aspect of the present invention is provided, an infrastructure node in a telecommunications network. The node may be configured to obtain a trigger event for changing status of a user equipment (UE) wirelessly attachable to the telecommunications network, receive from a subscriber registration node information of subscribed allocation and retention priority (ARP) for the UE, the ARP information comprising a combination of legacy ARP and evolved ARP, include the legacy and evolved ARP information in a control message transmitted to a gateway node, obtain from the gateway node information about an authorized ARP; and transmit the authorized ARP information to a radio network connecting the UE.

The infrastructure node may be a Serving GPRS Support node (SGSN), and wherein the infrastructure node may further be configured to map legacy ARP to evolved ARP.

BRIEF DESCRIPTION OF THE DRAWINGS

In the following the invention will be described in a non-limiting way and in more detail with reference to exemplary embodiments illustrated in the enclosed drawings, in which.

DETAILED DESCRIPTION

Figure 1:
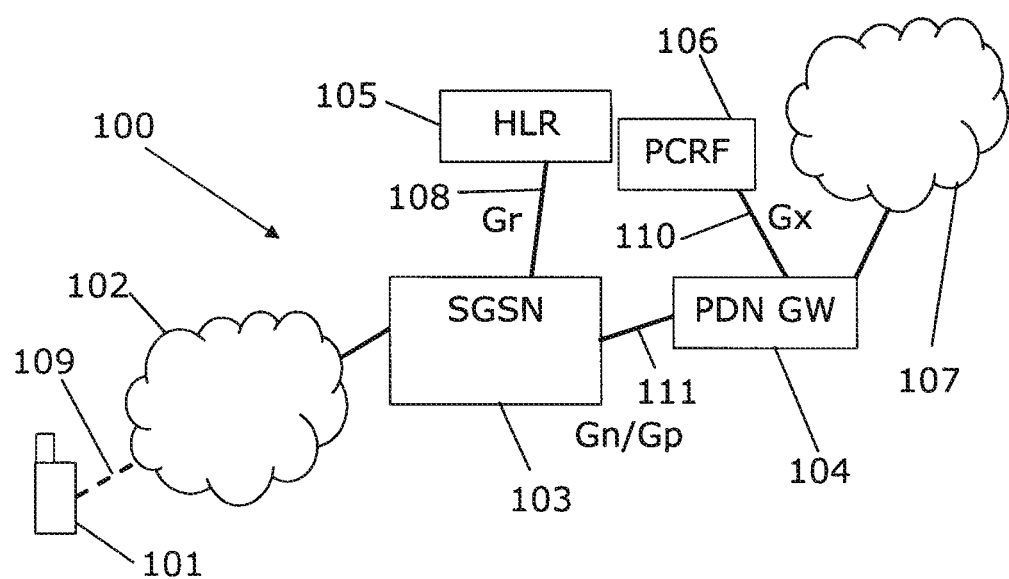
FIG. 1 illustrates schematically a network system according to the present invention.

In FIG. 1, reference numeral 100 generally depicts a telecommunications network according to the present invention. The network comprises a mobility handling node 103, e.g. an SGSN, a packet data network gateway 104 (GGSN/PDN-GW), a subscription database 105, e.g. a Home Location Register (HLR) or Home Subscriber Server (HSS), and a Policy and Charging Rules Function node 106 (PCRF). The mobility node is connected to a radio access network 102 which in turn connects a user equipment 101 (UE) using suitable wireless communication technology 109. The SGSN is connected to the PDN-GW using a Gn/Gp interface 111 and to the HLR using a Gr interface 108.

Furthermore, the GGSN/PDN-GW is connected to the PCRF using a Gx interface 110. It should be noted that the nodes in the network are physically interconnected using routers, switches, cabling, and other similar devices; however, these are not shown since they are not needed for the understanding of the present invention.

Figure 2:
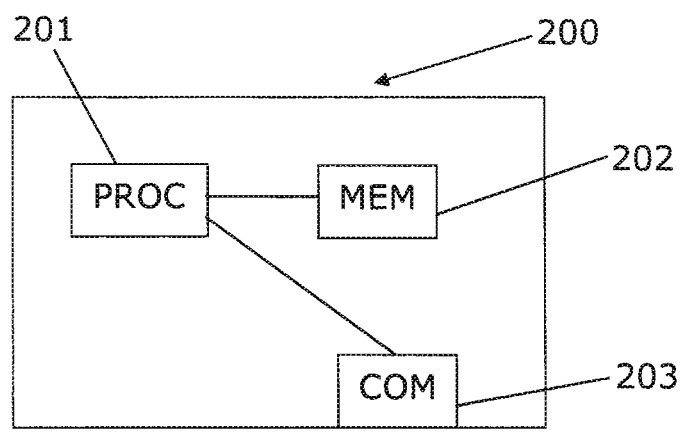
FIG. 2 illustrates schematically a node according to the present invention.

The nodes 200 forming the network 100 all comprise at least one processing unit 201 as shown in FIG. 2. Furthermore, the nodes also comprise at least one memory unit 202 and at least one communication interface 203. The processing unit may be any suitable type, such as for instance a microprocessor, digital signal processor (DSP), application specific integrated circuit (ASIC), or field programmable gate array (FPGA) configured to execute software or hardware instruction sets stored in the memory unit or stored in the processing unit. The memory unit may be of a volatile and/or non-volatile type and it provides a computer readable storage medium. The communication interface is advantageously a packet data interface, such as for instance of Ethernet type.

When a change in session is performed the mobility management node obtains ARP information from the subscriber database. This ARP information is stored in the subscriber database and is related to the user as a subscribed ARP.

The subscribed ARP is part of Subscribed QoS profile for a certain PDN connection which is stored in the subscriber database, e.g. the HLR, and is delivered to the mobility management node, e.g. SGSN, via Gr interface during UE attachment to the network.

When UE activates a primary PDP context, the SGSN includes the requested ARP based on the subscribed ARP and its own admission and congestion control to PDN-GW/GGSN via Gn/Gp interface, where PDN-GW/GGSN may grant ARP based on the result either from interaction together with Policy and Charging Control function or/and its own admission and congestion control.

The responded ARP from the PDN-GW/GGSN then becomes Authorized ARP (or negotiated) and is further transmitted to Radio network, i.e. RNC or BSS.

Figure 3:
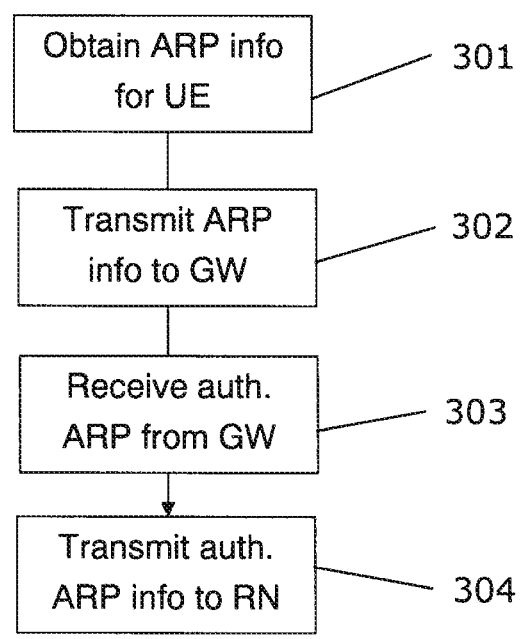
FIG. 3 illustrates schematically in a block diagram a method according to the present invention.

This is illustrated in FIG. 3 which shows steps of a method according to the present invention. First subscribed ARP information is obtained 301 from the HLR in the SGSN. The SGSN transmit 302 a request control message to the gateway comprising the ARP information. The SGSN receives 303 a response control message from the gateway comprising authorized ARP information. The SGSN forwards 304 the authorized ARP information to radio network.

In the solution according to the present invention, optional information elements (IE) is introduced that carry the Evolved ARP information on both Gr and Gn interfaces.

The same principle introduced by the present invention is also applied for PDN-GW and MME when come to inter RAT mobility cases, i.e. between 2G/3G Gn/Gp SGSN and MME.

Figure 4:
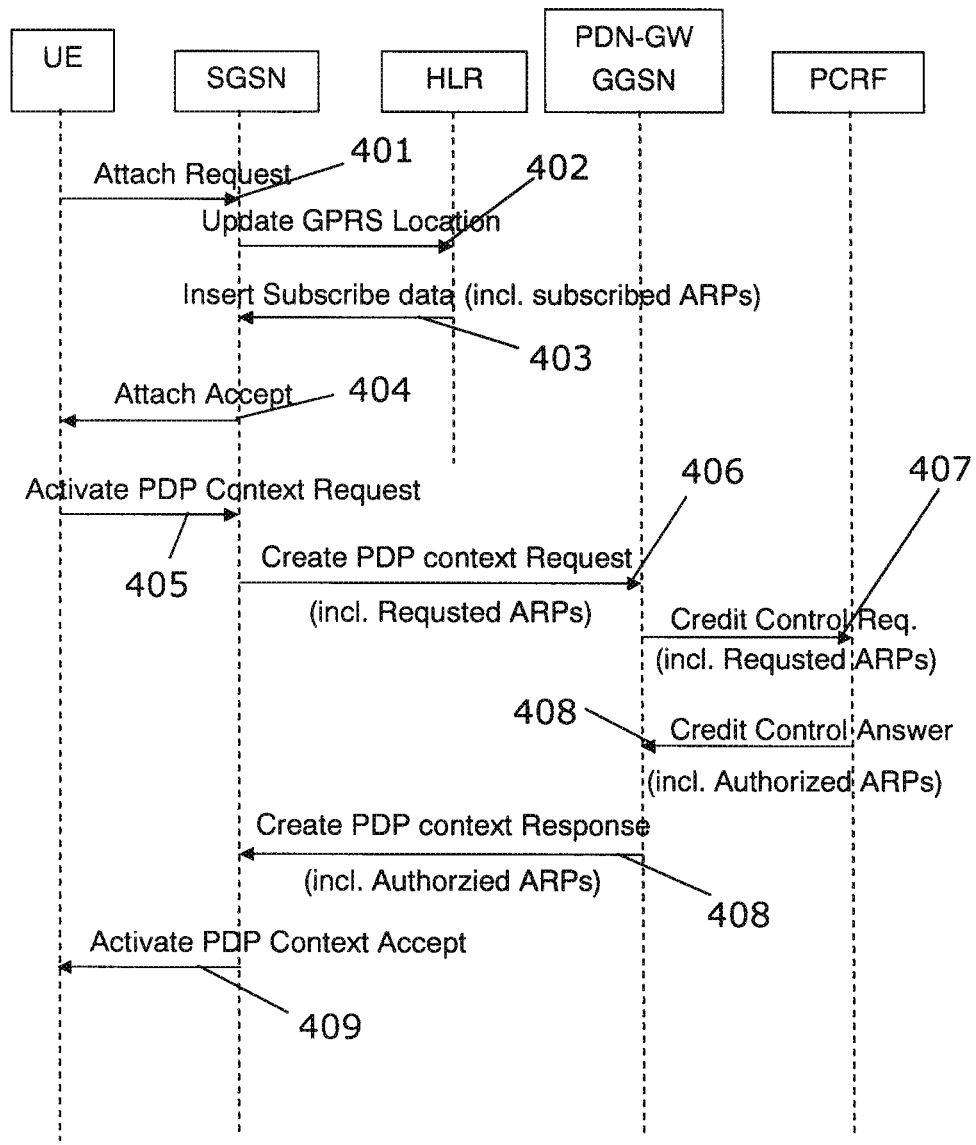
FIG. 4 illustrates schematically in a sequence diagram a method according to the present invention.

FIG. 4 shows how ARP is handled during attach and PDP context activation in the home PLMN, i.e. Gp interface is not depicted. FIG. 4 is only an example use of the solution according to the present invention; an example for an initial attachment of a UE to the network.

The UE sends 401 an attach request to the SGSN, via appropriate radio network nodes, which in turn sends 402 a message with an update of GPRS location to the HLR of the UE. The HLR responds 403 with an insert subscribe data message comprising subscribed ARP information to the SGSN. The SGSN then sends 404 an attach accept message back to the UE.

The UE sends 405 a request for an activation of PDP context to the SGSN which in turn send 406 a create PDP context request to the PDN-GW/GGSN comprising requested ARP from the subscribed ARP. The PDN-GW/GGSN will communicate 407 and 408 with the PCRF for credit control and other authorizations. The request comprises the requested ARP and the answer response comprises authorized ARP from the PCRF.

The PDN-GW/GGSN will respond 408 to the SGSN with a create PDP context response comprising authorized ARP(s). The SGSN will in turn send 409 an activate PDP context accept message.

It should be noted that in the above examples the term "PDN-GW/GGSN" is meant as a PDN-GW implementing Gn/Gp interface to communicate with a legacy SGSN or a legacy GGSN without EPC interfaces.

It should be appreciated that not all signaling is shown in FIG. 4, but only the signaling relevant for illustrating an example use of the present invention.

There are several different situations that each are handled differently, below some situations are discussed and their respective solutions.

(1) If the HLR supports Evolved ARP, both legacy subscribed ARP and new Evolved subscribed ARP are delivered from HLR to SGSN through MAP_INSERT_SUBSCRIBER_DATA procedure via Gr interface when UE attaches in 2G/3G network, otherwise only legacy subscribed ARP is sent.

(2) An Evolved ARP supported SGSN includes the subscribed Evolved ARP and legacy ARP in a GTP message "Create PDP context request" using GTP IE Quality of Service profile and new optional IE Evolved ARP to the PDN-GW/GGSN if the UE try to activate PDP context.

(3) If an Evolved ARP supported SGSN receives only legacy ARP from HLR, the SGSN maps it to Evolved ARP based on Annex E in 3GPP 23.401, and include the subscribed Evolved ARP and legacy ARP in the GTP message "create PDP context request" using GTP IE Quality of Service profile and new optional IE Evolved ARP to the PDN-GW/GGSN.

(4) If the SGSN does not recognize the Evolved ARP received from HLR, it include only the legacy ARP in the GTP message "create PDP context request" using GTP IE Quality of Service profile to the PDN-GW/GGSN.

(5) If an Evolved ARP supported PDN-GW/GGSN receives only legacy ARP, it maps it to Evolved ARP based on Annex E in 3GPP 23.401, and send it to PCRF to ask for authorization. When the PDN-GW/GGSN get the authorized Evolved ARP via Gx interface from PCRF, it maps it back to legacy ARP and then include it only in the GTP message "Create PDP context response" back to SGSN.

(6) If an Evolved ARP supported PDN-GW/GGSN receives both the Evolved ARP and legacy ARP in the GTP message "Create PDP context request", it uses Evolved ARP to ask for authorization towards PCRF via Gx interface. When the PDN-GW/GGSN get the authorized Evolved ARP, it send only the Evolved ARP in the GTP message "Create PDP context Response" back to SGSN.

(7) If a legacy GGSN does not recognize the Evolved ARP received from SGSN, it grants the requested ARP based on its own admission and congestion control.

The present invention provides a solution for seamless migration from legacy ARP to the Evolved ARP concept to allow introducing the services which Evolved ARP is required, and the same time fully backward compatible.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be at least in part implemented by means of both hardware and software, and that several "means" or "units" may be represented by the same item of hardware.

The above mentioned and described embodiments are only given as examples and 20 should not be limiting to the present invention. Other solutions, uses, objectives, and functions within the scope of the invention as claimed in the below described patent claims should be apparent for the person skilled in the art.

ABBREVIATIONS

GTP: GPRS Tunnelling protocol
ARP: Allocation and Retention Priority
SGSN: Serving GPRS support node
GGSN: Gateway GPRS support node
RNC: Radio network controller
UE: User equipment
UMTS: Universal Mobile telecommunications system
E-UTRAN: Evolved UTRAN
UTRAN: Universal terrestrial radio access network
GBR: Guaranteed bit rate
EPS: Evolved packet system
EPC: Evolved packet core
eNB: evolved Node B
PDN: Packet data network
PDN-GW: Packet data network gateway
BSS: Base station subsystem
PDP: Packet data protocol
MME: Mobility management entity
QoS: Quality of Service
IE: Information element
PCRF: Policy and charging rules function
RAT: Radio access technology
HLR: Home location register BSC Base station controller
Definitions
Gi: Reference point between a GGSN and a packet data network.
Gn: Interface between a SGSN within the same or different PLMNs or between SGSN and a GGSN within the same PLMN.
Gp: Interface between a SGSN and a Pdn-GW/GGSN in different PLMNs. The Gp interface allows support of GPRS network services across areas served by the co-operating GPRS PLMNs.
Gr: Interface between an SGSN and an HLR.
Gx: It provides transfer of (QoS) policy and charging rules from PCRF to Policy and charging enforcement function (PCEF) in the PDN-GW.

The invention claimed is:

1. A method, in an infrastructure node, for handling allocation and retention priority in a telecommunications network, the method comprising:
receiving, at the infrastructure node, subscribed allocation and retention priority (ARP) information for a user equipment (UE), the subscribed ARP information comprising a combination of first ARP information and evolved ARP information, the first ARP information comprising a first priority value defining an importance of a resource request, and the evolved ARP information comprising a second priority value that also defines the importance of said resource request, the second priority value being distinct from the first priority value;
including the first ARP information and evolved ARP information in a control message;
transmitting the control message;
obtaining from a gateway node that received the control message information about an authorized ARP; and
transmitting the authorized ARP information to a radio network node.

2. The method of claim 1, wherein the authorized ARP information is transmitted in both an Evolved ARP information element and a Quality of Service Profile information element.

3. The method of claim 1, further comprising obtaining a trigger event for changing status of the UE, wherein the trigger event is an activation of primary PDP context.

4. The method of claim 1, further comprising obtaining a trigger event for changing status of the UE, wherein the trigger event is an inter SGSN mobility procedure.

5. The method of claim 1, further comprising obtaining a trigger event for changing status of the UE, wherein the trigger event is at least one of an inter SGSN Routing Area Update and a Packet Switched (PS) handover.

6. The method of claim 1, wherein the infrastructure node is one of an SGSN and an MME.

7. The method of claim 1, wherein the subscribed ARP information is received via a Gr interface.

8. The method of claim 1, wherein the subscribed ARP information is received from one of an HLR and an HSS.

9. The method of claim 1, wherein the control message is a create PDP context request using a GPRS Tunnelling Protocol comprising information elements for Quality of Service and evolved ARP.

10. The method of claim 1, wherein the first priority value is less than or equal to 3.

11. The method of claim 1, wherein the gateway node is one of: i) a PDN-GW with a Gn or Gp interface towards an SGSN and ii) a GGSN without an EPC interface.

12. An infrastructure node in a telecommunications network, the infrastructure node comprising:
   a memory;
   one or more communication interfaces; and
   a processor coupled to the memory and the communication interface, wherein
   the processor is configured such that, as a result of the infrastructure node receiving subscribed allocation and retention priority (ARP) information comprising i) first ARP information comprising a first priority value defining an importance of a resource request and ii) evolved ARP information comprising a second priority value also defining the importance of the resource request, the processor generates a control message comprising the first ARP information and the evolved ARP information and employs at least one of the one or more communication interfaces to transmit the control message, and
   the processor is further configured such that, as a result of the infrastructure node receiving authorized ARP information transmitted by a gateway node after the gateway node received the control message, the processor employs at least one of the one or more communication interfaces to transmit the authorized ARP information to a radio network node.

13. The infrastructure node of claim 12, wherein the infrastructure node is a Serving GPRS Support node (SGSN).

14. The infrastructure node of claim 12, wherein the first priority value is less than or equal to 3.

15. The method of claim 14, wherein the second priority value is greater than 3 and the importance is a relative importance.

16. A method for handling allocation and retention priority in a telecommunications network, comprising steps of:
   a mobility management apparatus (MMA) receiving, from a first network node, a first message comprising a first allocation and retention priority (ARP) priority value that is less than or equal to 3 and that defines a relative importance of a resource request;
   after receiving the first message, the MMA obtaining an evolved ARP priority value that is less than or equal to 15 and that also defines said relative importance of said resource request;
   the MMA generating a second message comprising the first ARP priority value and the evolved ARP priority value; and
   the MMA transmitting, to a second network node, the second message.

17. The method of claim 16, wherein the step of obtaining the evolved ARP priority value comprises mapping the received first ARP priority value to an evolved ARP priority value, thereby obtaining the evolved ARP priority value.

18. The method of claim 16, wherein
   the first message contains the evolved ARP priority value, and
   the step of obtaining the evolved ARP priority value comprises obtaining the evolved ARP priority value from the first message.

19. The method of claim 16, wherein
   prior to the MMA receiving the first message from the first network node, the MMA: receives an attach request message transmitted by a user equipment (UE) and transmits an update message to the first network node in response to receiving the attach request message,
   the first network node is configured to transmit the first message as a response to the update message, and
   the MMA transmits to the UE an attach accept message in response to receiving the first message from the first network node.

20. The method of claim 19, wherein
   the first network node comprises a data storage system storing a subscription database, and
   the first network node is configured to retrieve the first ARP priority value from said subscription database and include said retrieved first ARP priority value in the first message in response to receiving the update message.

\* \* \* \* \*

UNITED STATES PATENT AND TRADEMARK OFFICE
CERTIFICATE OF CORRECTION

| | | |
|---|---|---|
| PATENT NO. | : 9,320,051 B2 | Page 1 of 1 |
| APPLICATION NO. | : 14/565641 | |
| DATED | : April 19, 2016 | |
| INVENTOR(S) | : Rydnell et al. | |

It is certified that error appears in the above-identified patent and that said Letters Patent is hereby corrected as shown below:

Specification

In Column 1, Line 9, delete "Mar. 17, 2012" and insert -- March 19, 2012 --, therefor.

In Column 5, Line 44, delete "and 20" and insert -- and --, therefor.

Claims

In Column 7, Line 34, in Claim 15, delete "The method" and insert -- The infrastructure node --, therefor.

In Column 7, Line 35, in Claim 15, delete "3and" and insert -- 3 and --, therefor.

Signed and Sealed this
Second Day of August, 2016

Michelle K. Lee
*Director of the United States Patent and Trademark Office*